US009664183B2

(12) United States Patent
Apdalhaliem et al.

(10) Patent No.: US 9,664,183 B2
(45) Date of Patent: May 30, 2017

(54) INTEGRATED HIGH THERMAL CONDUCTIVE FIBER AS COOLING FIN FOR SMA ACTUATOR WITH EXPANDABLE SLEEVE

(71) Applicant: THE BOEING COMPANY, Chicago, IL (US)

(72) Inventors: Sahrudine Apdalhaliem, Seattle, WA (US); Moushumi Shome, Kent, WA (US); Kimberly D. Meredith, Newcastle, WA (US); Waeil M. Ashmawi, Bellevue, WA (US); Morteza Safai, Newcastle, WA (US); Frederick T. Calkins, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 148 days.

(21) Appl. No.: 14/593,106

(22) Filed: Jan. 9, 2015

(65) Prior Publication Data
US 2016/0201654 A1 Jul. 14, 2016

(51) Int. Cl.
*B64C 13/28* (2006.01)
*F03G 7/06* (2006.01)
(Continued)

(52) U.S. Cl.
CPC ............. *F03G 7/065* (2013.01); *B64C 13/28* (2013.01); *F28F 13/00* (2013.01); *F28F 21/02* (2013.01); *F28F 21/06* (2013.01)

(58) Field of Classification Search
CPC ........... B64C 13/28; F03G 7/065; F28D 11/06
See application file for complete search history.

(56) References Cited

U.S. PATENT DOCUMENTS 2,542,967 A * 2/1951 Waechter ............. F16B 7/1445
248/188.5
3,468,501 A * 9/1969 Baum ..................... B64D 7/02
244/3.1
(Continued)

FOREIGN PATENT DOCUMENTS

WO 2010/057269 A1 5/2010

OTHER PUBLICATIONS

European Search Report for EP 15194126, Jun. 2, 2016.
(Continued)

*Primary Examiner* — Tien Dinh
*Assistant Examiner* — Richard R Green
(74) *Attorney, Agent, or Firm* — Patterson + Sheridan, LLP

(57) ABSTRACT

Aspects of the present disclosure generally relate to an SMA actuator that includes a cooling device disposed within a torque tube. In one aspect, the cooling device includes a sliding sleeve, an expandable sleeve, and plurality of cooling fins coupled to the expandable sleeve. Axial movement of the sliding sleeve relative to the expandable sleeve facilitates radial expansion of the expandable sleeve and urges the cooling fins into contact with the torque tube. The cooling fins function as heat sinks when in contact with the torque tube to facilitate the removal of heat from the torque tube to increase the cooling rate of the torque tube. During heating of the torque tube, the cooling fins may be spaced apart from the torque tube to reduce the thermal mass that is heated, thus increasing the heating rate of the torque tube.

29 Claims, 8 Drawing Sheets

(51) Int. Cl.
*F28F 13/00* (2006.01)
*F28F 21/02* (2006.01)
*F28F 21/06* (2006.01)

(56) References Cited

U.S. PATENT DOCUMENTS

| | | | |
|---|---|---|---|
| 5,127,228 A | 7/1992 | Swenson | |
| 6,404,636 B1 * | 6/2002 | Staggers | H05K 7/20445 |
| | | | 165/185 |
| 6,499,952 B1 | 12/2002 | Jacot et al. | |
| 6,617,199 B2 * | 9/2003 | Smith | H01L 23/3733 |
| | | | 257/E23.09 |
| 6,832,740 B1 * | 12/2004 | Ransom | F41G 7/2233 |
| | | | 244/3.15 |
| 6,981,374 B2 | 1/2006 | von Behrens et al. | |
| 7,464,548 B2 * | 12/2008 | Yson | F03G 7/065 |
| | | | 60/527 |
| 2013/0239565 A1 | 9/2013 | Browne et al. | |

OTHER PUBLICATIONS

J.G. Hurst and P.J. Giarratano, Thermal Conductivity and Electrical Resistivity Standard Reference Materials: Austenitic Stainless Steel, SRM's 735 and 798, from 4 to 1200 K, Mar. 1975, National Bureau of Standards, Boulder, Colorado.

\* cited by examiner

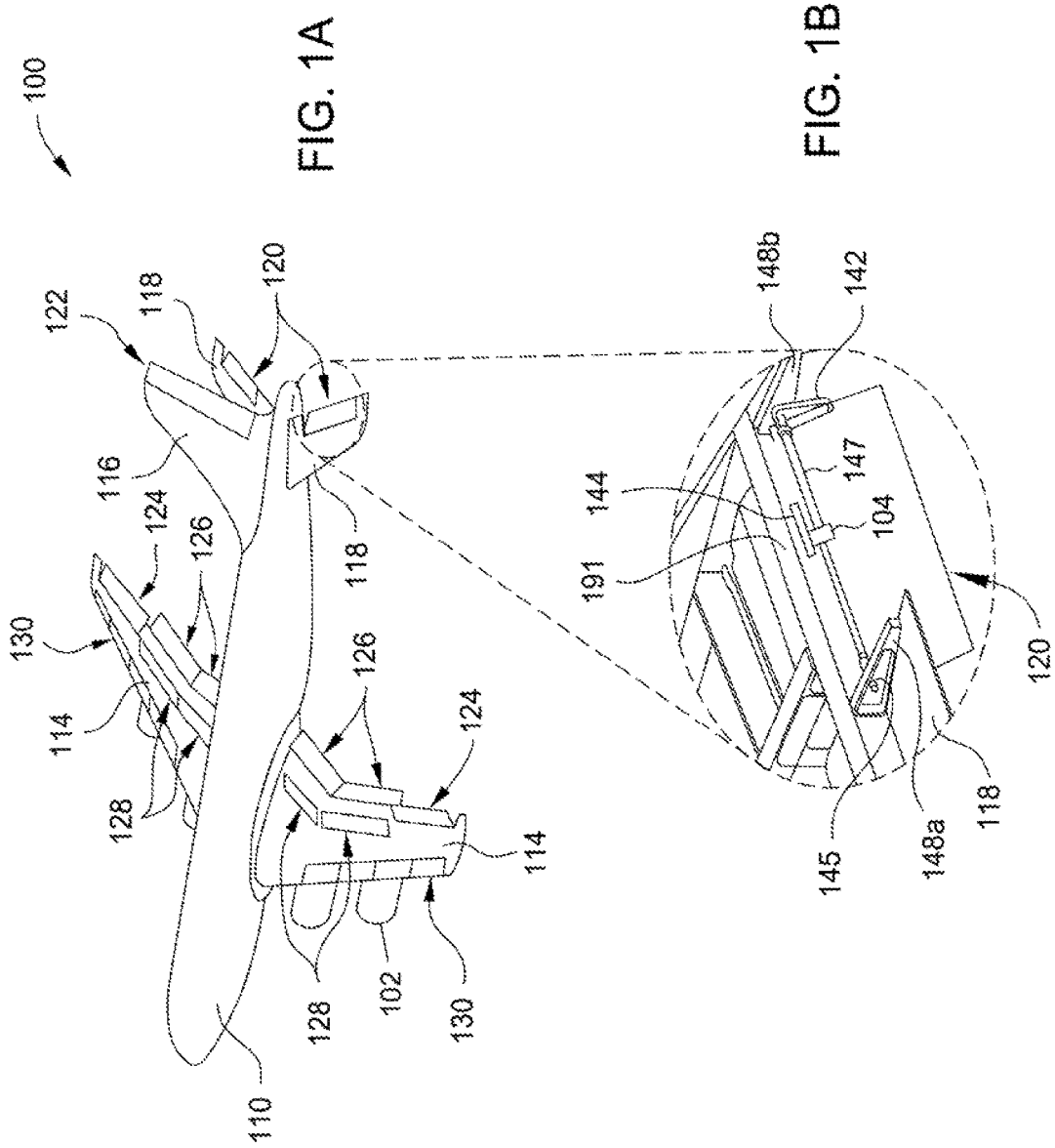

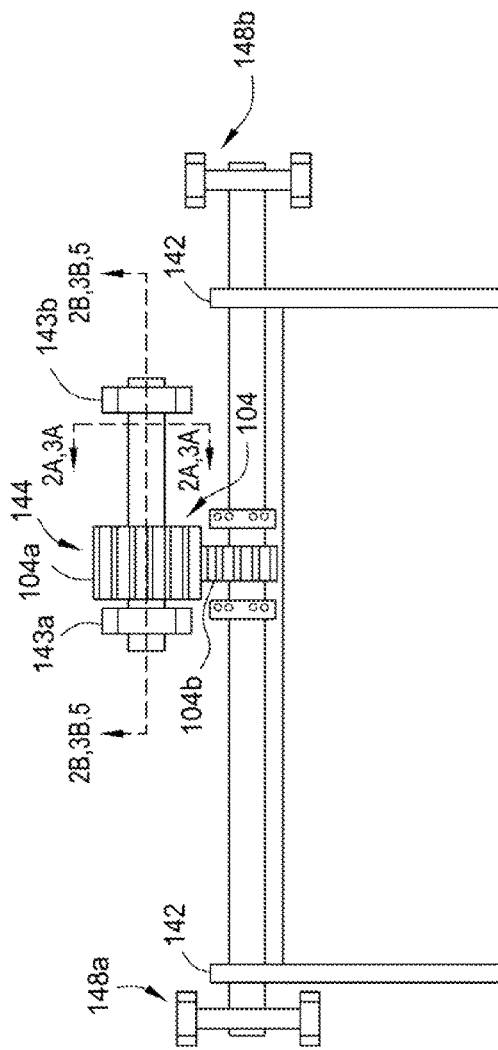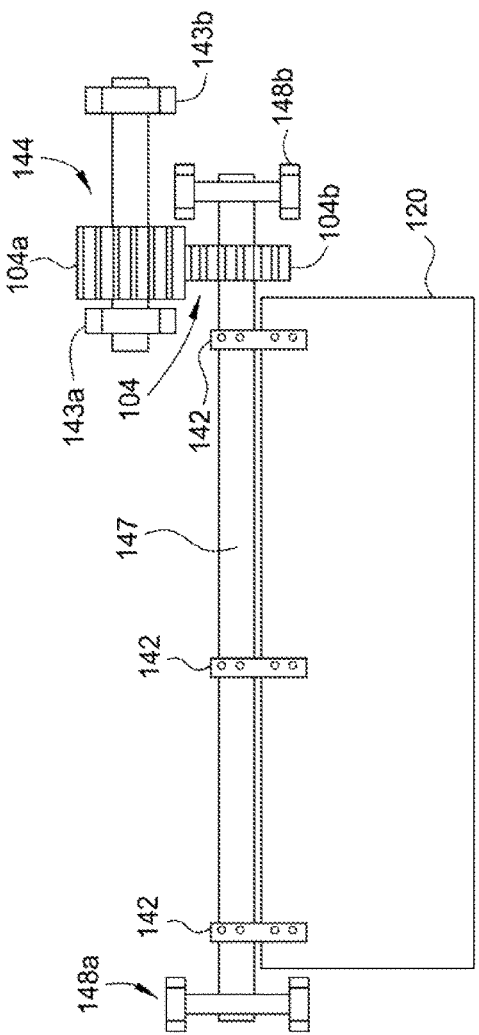

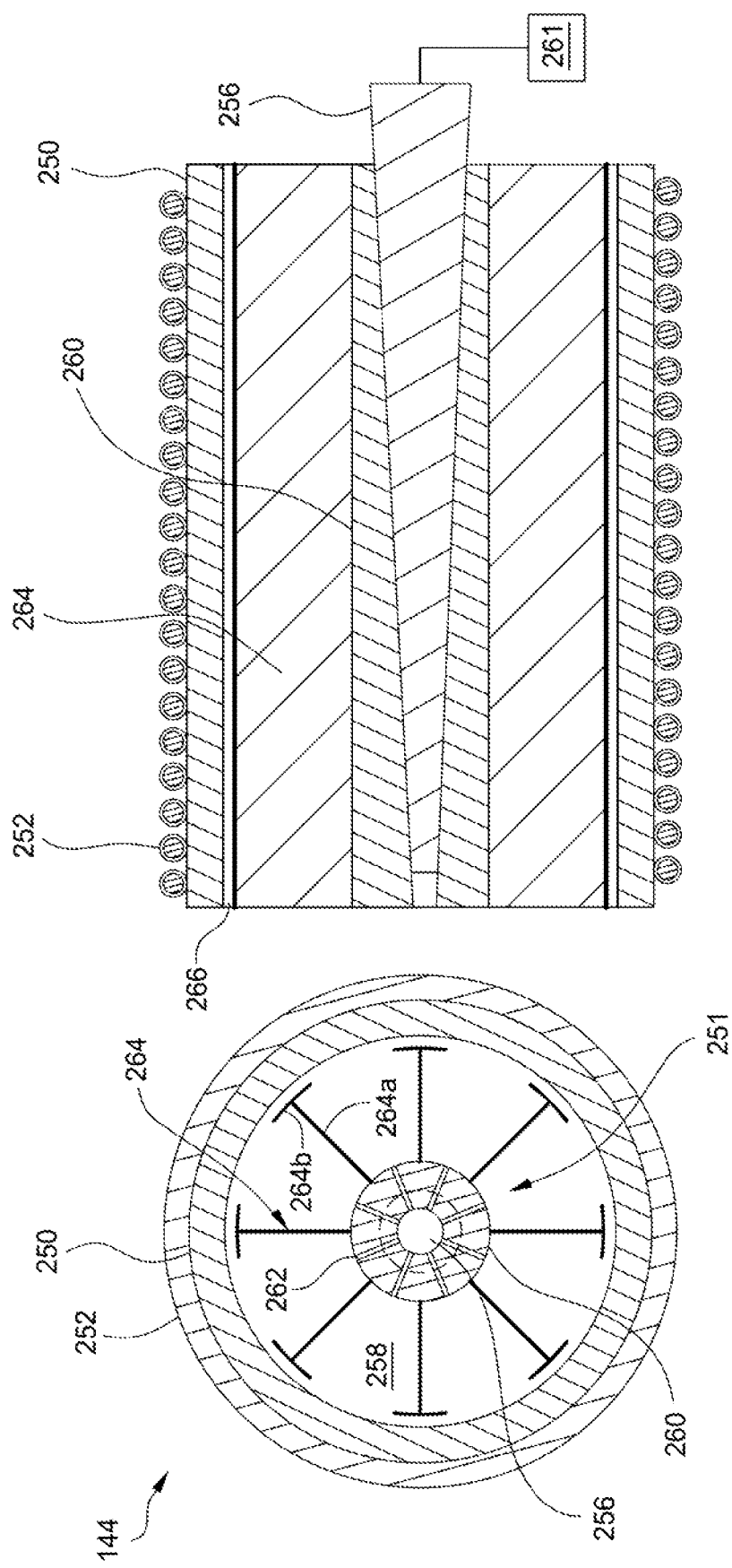

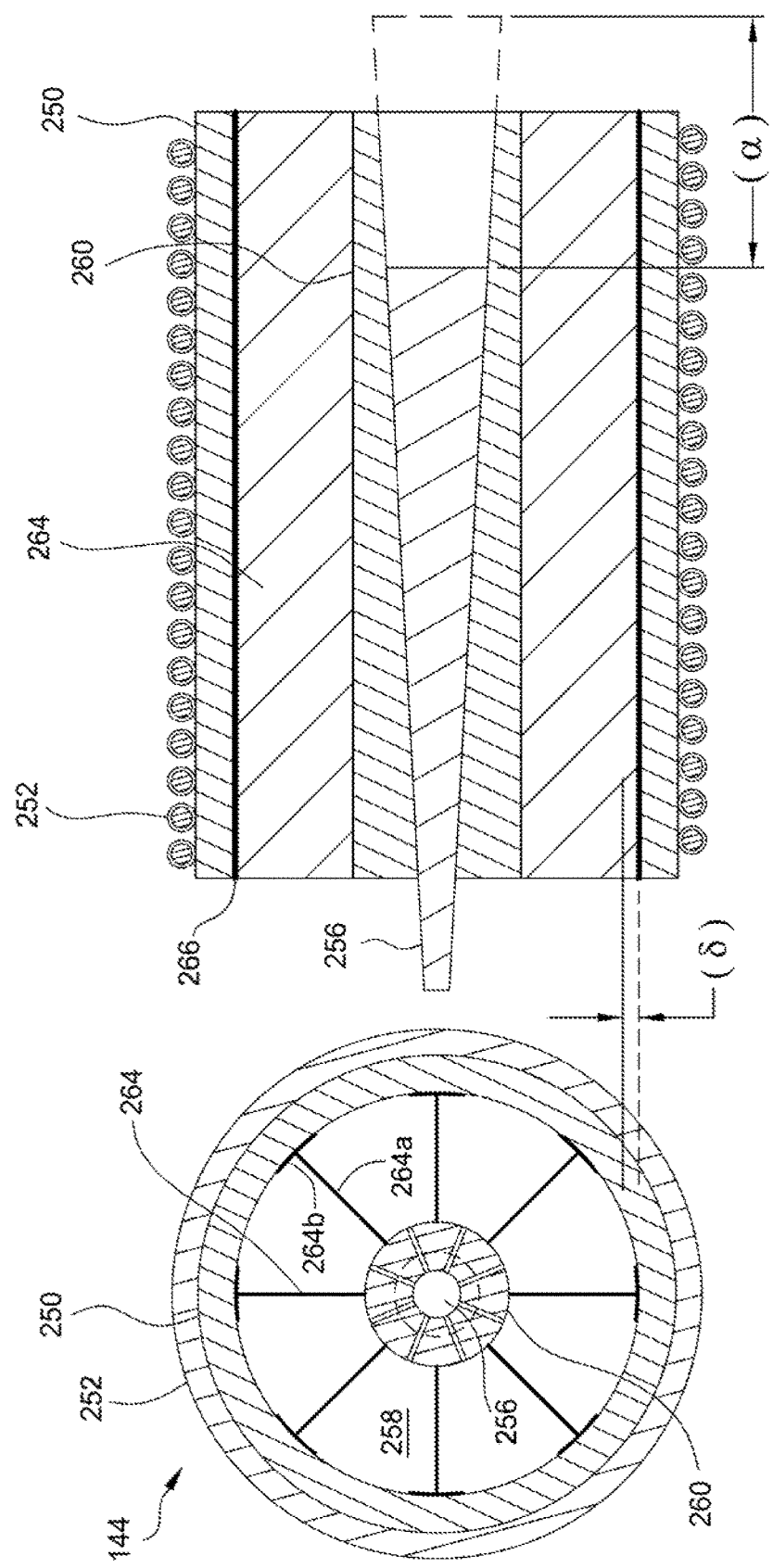

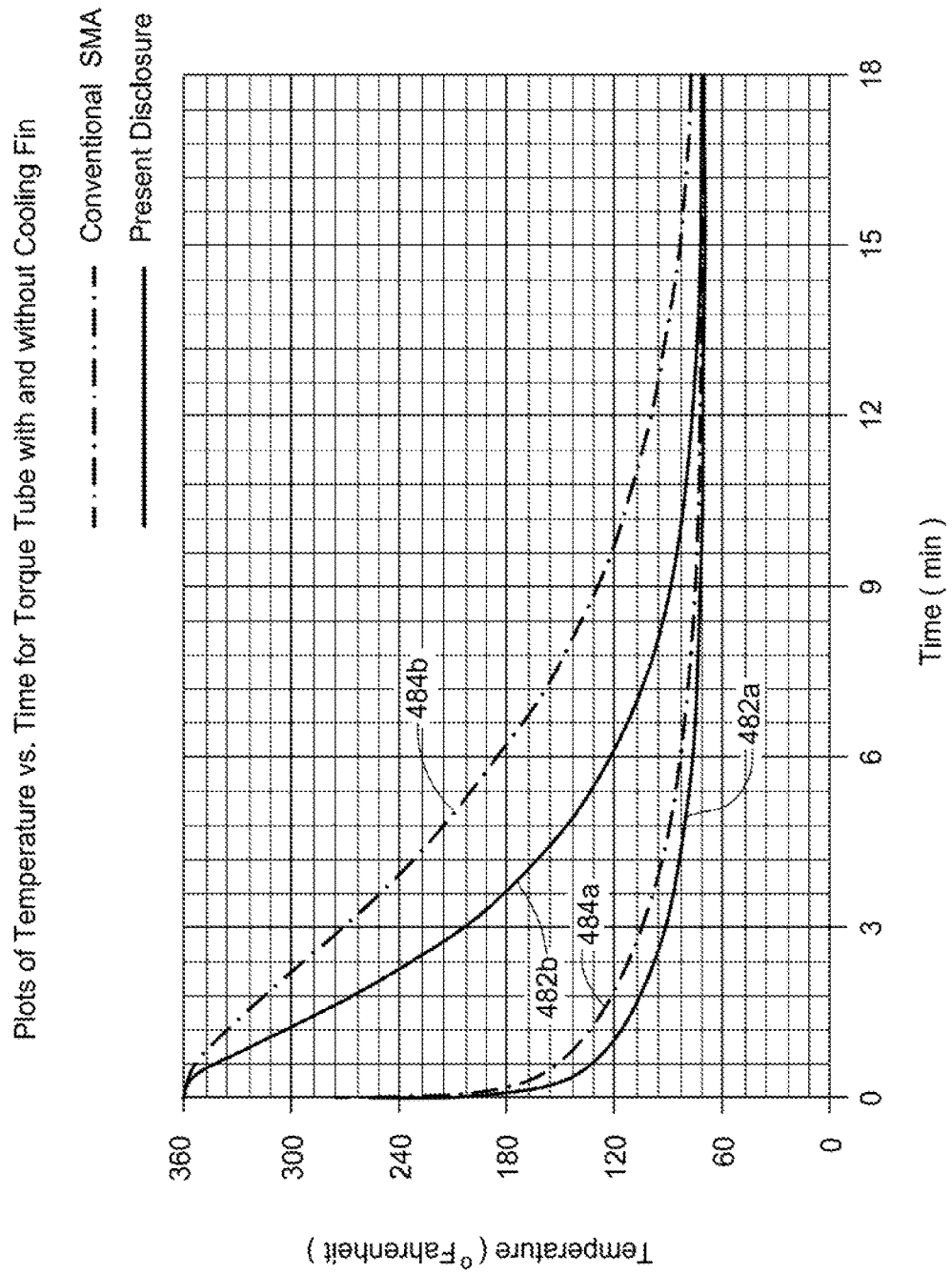

INTEGRATED HIGH THERMAL CONDUCTIVE FIBER AS COOLING FIN FOR SMA ACTUATOR WITH EXPANDABLE SLEEVE

BACKGROUND

Field

Aspects of the present disclosure generally relate to a shape-memory alloy (SMA) actuator and a cooling device having increased cooling efficiency.

Description of the Related Art

An SMA is an alloy that "remembers" its original shape and that when deformed returns to its pre-deformed shape when heated. Actuation of the SMA can be effected through heating and cooling of the SMA. In one example, an SMA actuator may include a torque tube that rotates in a first direction when the torque tube is heated, and rotates in a second direction when the torque tube cools. The rate of heating and cooling (measured in degrees of rotation per second) controls the rate of movement of the SMA actuator. The rate of heating can be controlled by controlling a heater, and the rate of cooling may depend on ambient conditions or a fluid flow.

Conventional SMA actuators are capable of being rapidly heated, however, satisfactory cooling times have posed challenges. The unsatisfactory cooling times have limited the cycle and/or response time of the SMA actuator. Additionally, cooling rates may be insufficient when the actuator is responsible for moving heavy or large components. More specifically, the torque tube will include a higher thermal mass due to an increased size necessary to provide more torque to rotate the larger component. The higher thermal mass of the SMA cannot be cooled at a fast enough rate to move the larger component at desired speeds.

Therefore, there is a need for an SMA actuator with increased cooling rates.

SUMMARY

Aspects of the present disclosure generally relate to an SMA actuator that includes a cooling device that may be disposed within a torque tube. The cooling device may include a sliding sleeve, an expandable sleeve, and plurality of cooling fins coupled to the expandable sleeve. Axial movement of the sliding sleeve relative to the expandable sleeve facilitates radial expansion of the expandable sleeve and urges the cooling fins into contact with the torque tube. The cooling fins function as heat sinks when in contact with the torque tube to facilitate the removal of heat from the torque tube thereby increasing the cooling rate of the torque tube. During heating of the torque tube, the cooling fins may be spaced apart from the torque tube to reduce the thermal mass that is heated, thus increasing the heating rate of the torque tube.

In one aspect, an actuator comprises a torque tube and a cooling device disposed within the torque tube. The cooling device comprises an expandable sleeve; a sliding sleeve disposed within the expandable sleeve and axially movable relative to the expandable sleeve; and one or more cooling fins coupled to an outer surface of the expandable sleeve.

In another aspect, a method of operating an actuator having a torque tube including a shape memory alloy and a cooling device disposed within the torque tube comprises moving the actuator in a first direction by applying heat to the torque tube. One or more cooling fins of the cooling device are spaced from the torque tube while applying heat. The method further comprises axially actuating a sliding sleeve of the cooling device in a first direction relative to an expandable sleeve of the cooling device to expand the expandable sleeve and to urge the one or more cooling fins into contact with the torque tube; and moving the actuator in a second direction opposite the first direction by cooling the torque tube. Cooling of the torque tube is facilitated by the cooling fins in contact with the torque tube. The cooling fins function as a heat sink to remove heat from the torque tube. The cooling fins also increase the relative surface area of material to be cooled, for example, in comparison to only the surface are of the torque tube, and therefore, the cooling fins expedite cooling.

In another aspect, a cooling device comprises an expandable sleeve; a sliding sleeve disposed within the expandable sleeve and axially movable relative to the expandable sleeve; and one or more cooling fins coupled to an outer surface of the expandable sleeve.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, and the disclosure may admit to other equally effective aspects.

FIG. 1A schematically illustrates an aircraft according to one aspect of the disclosure.

FIG. 1B schematically illustrates an enlarged portion of FIG. 1A.

FIGS. 1C and 1D schematically illustrate an SMA actuator coupled to a flight control surface.

FIGS. 2A and 2B schematically illustrate sectional views of an SMA actuator during a heating mode, according to one aspect of the disclosure.

FIGS. 3A and 3B schematically illustrate sectional views of an SMA actuator during a cooling mode, according to one aspect of the disclosure.

FIG. 4 is a graph illustrating cooling rates for SMA actuators of the present disclosure versus conventional SMA actuators.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 2C:
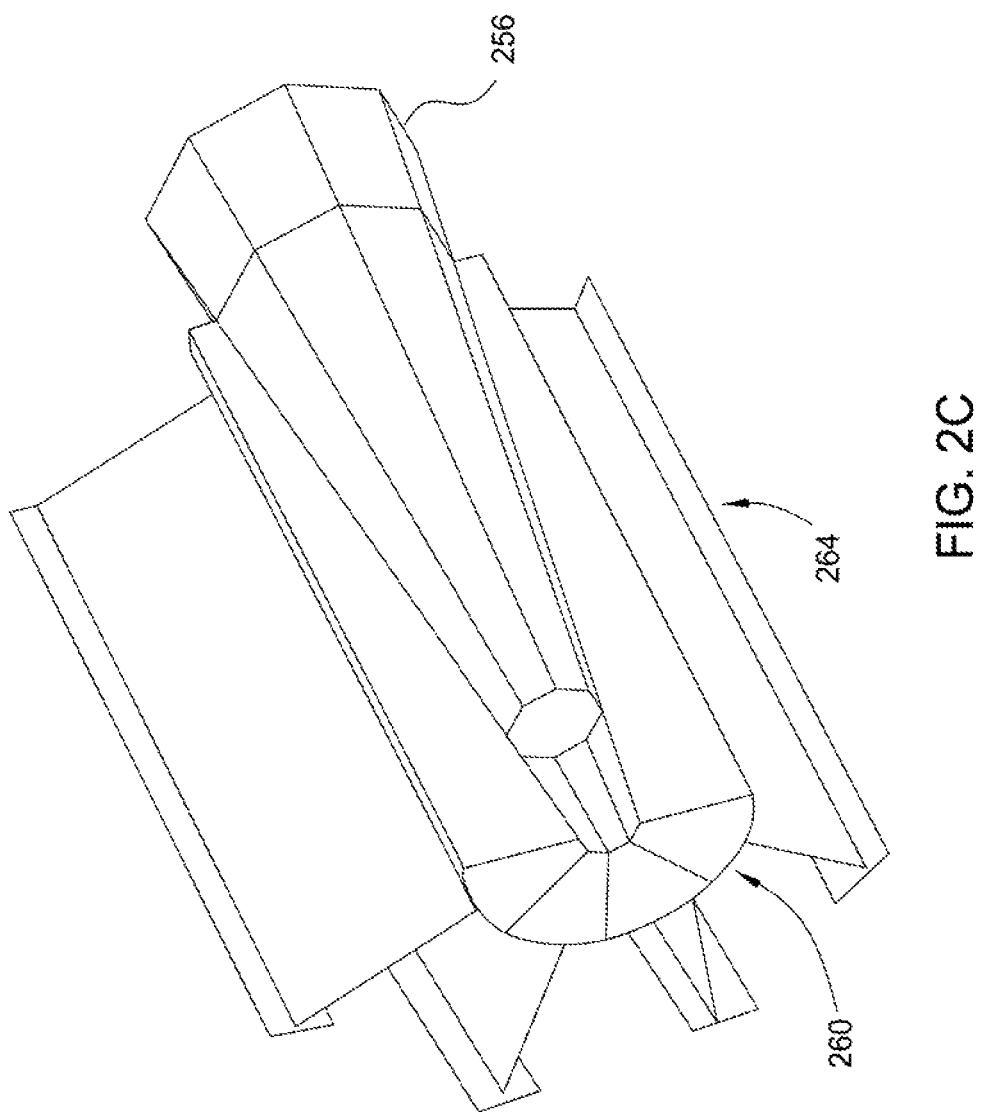
FIG. 2C illustrates a perspective partial sectional view of an SMA actuator, according to one aspect of the disclosure.

Aspects of the present disclosure generally relate to an SMA actuator that includes a cooling device disposed within a torque tube. In one aspect, the cooling device may include a sliding sleeve, an expandable sleeve, and plurality of cooling fins coupled to the expandable sleeve. Axial movement of the sliding sleeve relative to the expandable sleeve facilitates radial expansion of the expandable sleeve and urges the cooling fins into contact with the torque tube. The cooling fins function as heat sinks when in contact with the torque tube to facilitate the removal of heat from the torque tube thereby increasing the cooling rate of the torque tube. During heating of the torque tube, the cooling fins may be spaced apart from the torque tube to reduce the thermal mass that is heated, thus increasing the heating rate of the torque tube.

FIG. 1A schematically illustrates an aircraft 100 according to one aspect of the disclosure. FIG. 1B schematically illustrates an enlarged portion of FIG. 1A, and in particular, of a horizontal stabilizer 118 having an upper surface thereof removed. FIGS. 10 and 1D schematically illustrate an SMA actuator 144 coupled to a flight control surface. The aircraft 100 illustrated in FIG. 1A includes fuselage 110 for holding passengers and cargo. Two wings 114, which provide the lift needed to fly the airplane, are coupled to opposite sides of the fuselage 110. A vertical stabilizer 116 and two horizontal stabilizers 118 are coupled to the fuselage 110 at a trailing end thereof. One or more engines 102 (four are shown, one is indicated), which provide the thrust needed to propel the aircraft 100 forward, are coupled to the wings 114.

Also present on the wings 114 of aircraft 100 are spoilers 128, flaps 126, and slats 130, which may be referred to as secondary flight control surfaces. Spoilers 128 are located on the wings 114 and perform a variety of different functions, including assisting in the control of vertical flight path, acting as air brakes to control the forward speed of the aircraft 100, and acting as ground spoilers to reduce wing lift to help maintain contact between the landing gear and the runway when braking. The flaps 126 and the slats 130 are located on the wings of the aircraft 100 to change the lift and drag forces affecting the aircraft 100, with the flaps 126 positioned at the trailing edge of wing 114 and slats 130 positioned at the leading edge wing 114. When the flaps 126 and the slats 130 are extended, the shape of the wing 114 changes to provide more lift. With an increased lift, the aircraft 100 is able to fly at lower speeds, thus simplifying both the landing procedure and the take-off procedure.

The aircraft 100 also includes primary flight controls to facilitate directional changes of the aircraft 100 during flight. The primary flight control surfaces on the aircraft 100 include ailerons 124, elevators 120, and a rudder 122. The ailerons 124 are located on the trailing edges of the wings 114 of the aircraft 100 and control the roll of the aircraft 100. The elevators 120 are located on the horizontal stabilizer 118 of the aircraft 100 and control the pitch of the aircraft 100. The rudder 122 is located on the vertical stabilizer 116 and controls the yaw of the aircraft 100. In some aircrafts, such as aircraft 100, there may be cables or wires (not shown) connecting pilot controls to actuators used to move the primary control surfaces. One such actuator is an SMA actuator 144.

The SMA actuator 144 is secured to the aircraft 100, for example a support beam 191 of the horizontal stabilizer 118, via brackets 143a, 143b disposed at opposite ends of the SMA actuator 144. The brackets 143a, 143b include openings formed therein for accepting a torque tube 250 (shown in FIG. 2A) of the SMA actuator 144. In one example, the SMA actuator 144 may be fixed with respect to the bracket 143b, but may be allowed to freely rotate with respect to the bracket 143a. The SMA actuator 144 is operatively coupled to a flight control support beam 147 through a gear assembly 104. The gear assembly 104 includes a first gear 104a fixedly coupled to the SMA actuator 144, and a second gear 104b fixedly coupled to the flight control support beam 147 and interconnected with the first gear 104a.

The flight control support beam 147 is coupled to the horizontal stabilizer 118 by brackets 148a, 148b. The brackets 148a, 148b are fixedly attached to a horizontal stabilizer 118 and include openings 145 formed therein for receiving and supporting opposite ends of a flight control support beam 147. Rotation of the flight control support beam 147 within the bracket 148a, 148b is facilitated by bearings, such as ball bearings, positioned around the flight control support beam 147 between the flight control support beam 147 and the brackets 148a, 148b.

One or more hinge ribs 142 may be fixedly attached to an external surface of the flight control support beam 147 to couple the flight control support beam 147 to a flight control surface, such as the elevator 120. The one or more hinge ribs 142 facilitate transfer of motion of the flight control support beam 147, when driven by the SMA actuator 144, to the elevator 120 to facilitate control of the aircraft 100.

In response to pilot input, the torque tube 250 (shown in FIG. 2A) of the SMA actuator 144 may be either heated or cooled, as explained below, resulting in rotational actuation of the SMA actuator 144. The rotational movement of the SMA actuator 144 is transferred to the elevator 120 through the flight control support beam 147 and the hinge ribs 142. Thus, actuation of the SMA actuator 144 results in movement of the elevator 120 relative to the horizontal stabilizer 118, thereby facilitating control of the elevator 120. Actuators similar to the SMA actuator 144 may be used to control other movable parts, such as other primary control surfaces, secondary control surfaces, landing gear, and the like. It is contemplated that the SMA actuator 144 may be positioned centrally with respect to the flight control support beam 147 or the flight control surface, as illustrated in FIG. 10, or that that SMA actuator 144 may be positioned at a lateral end of the flight control support beam 147 or the flight control surface, as shown in FIG. 1D.

FIGS. 2A and 2B schematically illustrate sectional views of an SMA actuator 144 during a heating mode, according to one aspect of the disclosure. FIG. 2C illustrates a perspective partial sectional view of the SMA actuator 144. The SMA actuator 144 illustrated in FIG. 2A is an axial section view along line 2A-2A of FIG. 1C. The SMA actuator 144 illustrated in FIG. 2B is a longitudinal sectional view along line 2B-2B of FIG. 1C.

The SMA actuator 144 includes an actuator torque tube 250 having a cylindrical shape, a heating coil 252 disposed around the torque tube 250, and a cooling device 251 positioned axially within the torque tube 250 throughout the length of the torque tube 250. The torque tube 250 may be formed from a shape memory alloy such as nickel-titanium alloy, copper-aluminum-nickel alloy, copper-zinc-aluminum alloy, and iron-manganese-silicon alloy. The heating coil 252, such as an inductive heating coil, is disposed helically around and in contact with an outer surface of the torque tube 250 to facilitate heating of the SMA actuator 144.

The cooling device 251 includes a sliding sleeve 256, an expandable sleeve 260, and one or more thermally conductive elements such as cooling fins 264. The sliding sleeve 256 is disposed centrally within a cavity 258 defined by the torque tube 250. The expandable sleeve 260 is disposed around and in contact with sliding sleeve 256. The outer surface of the sliding sleeve 256 has a tapered surface, such that sliding sleeve 256 forms a polygonal cone or a truncated polygonal cone, which complements a tapered inner surface of the expandable sleeve 260. Stated otherwise, in one aspect, the sliding sleeve 256 and the expandable sleeve 260 have opposing surfaces with the same magnitude of taper. The polygonal shape of the sliding sleeve 256 may prevent rotation of the sliding sleeve 256 relative to the expandable sleeve 260. The sliding sleeve 256 and the expandable sleeve 260 extend axially through the torque tube 250.

As the sliding sleeve 256 is actuated axially in a first direction relative to the expandable sleeve 260 via an actuator 261, the expandable sleeve 260 is radially expandable. The expandable sleeve 260 includes one or more openings 262 formed therein to facilitate radial expansion of the expandable sleeve 260. Radial expansion of the expandable sleeve 260 results in radially outward actuation of the cooling fins 264 (eight are shown in FIG. 2A) into contact with an inner surface of the torque tube 250 (as illustrated in FIGS. 3A-3B). The cooling fins 264 may be coupled to the expandable sleeve 260 by an adhesive connection, such as an epoxy. In one aspect, the cooling fins 264 may be co-bonded or co-cured with the expandable sleeve 260. Axial actuation of the sliding sleeve 256 in a second direction opposite the first direction by the actuator 261 allows the expandable sleeve 260 to contract, thus spacing the cooling fins 264 from the torque tube 250 to facilitate heating of the torque tube 250. The actuator 261 may be any suitable electrical, mechanical, or electro-mechanical, or pneumatic actuator, such as hydraulic actuator or a solenoid.

FIGS. 2A-2C illustrate the SMA actuator 144 in a heating mode. In a heating mode, the expandable sleeve 260 is in a retracted or non-expanded configuration such that the cooling fins 264 are spaced from torque tube 250 by a gap 266. Separation of the cooling fins 264 from the torque tube 250 reduces the thermal mass to be heated by the heating coil 252 by eliminating physical contact between the cooling fins 264 and the torque tube 250, thus increasing the heating rate of the torque tube 250 and thereby improving performance of the SMA actuator 144.

Figure 3C:
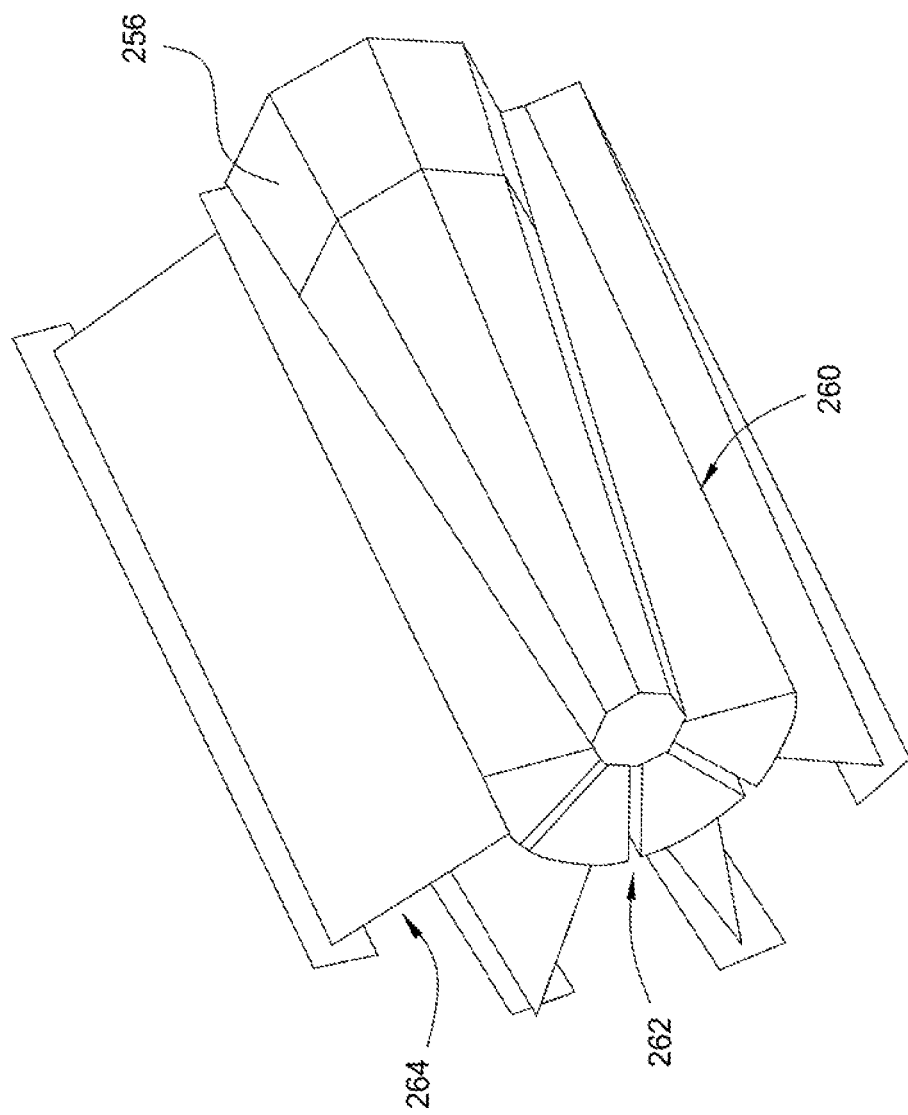
FIG. 3C illustrates a perspective partial sectional view of an SMA actuator, according to one aspect of the disclosure.

FIGS. 3A and 3B schematically illustrate respective axial and longitudinal section views of an SMA actuator 144 during a cooling mode, according to one aspect of the disclosure. FIG. 3C illustrates a perspective partial sectional view of the SMA actuator 144. In the cooling mode, the sliding sleeve 256 is axially actuated, e.g., a distance a, to radially expand the expandable sleeve 260 outward, e.g., a distance 6, driving the cooling fins 264 into physical contact with an inner surface of the torque tube 250 to increase the transfer of thermal energy therebetween. Each cooling fin 264 includes a component such as a shaft 264a, and a contact pad 264b. The contact pad 264b is disposed at a radially outward end of the shaft 264a and is adapted to contact the torque tube 250. The contact pad 264b may be a pad or other shape to increase the contact area between the torque tube 250 and the cooling fin 264.

In one aspect, the contact pads 264b have an arcuate shape that complements the inner circumference of the torque tube 250. The contact pads 264b increase the surface area of the cooling fin 264 in contact with the torque tube 250 to increase thermal contact therebetween thus providing a heat sink and facilitating an increased rate of cooling of the torque tube 250. A thermally conductive material, such as grease, may be applied to a radially outward surface of the contact pads 264b to increase thermal contact between the torque tube 250 and the contact pads 264b. Additionally, increased axial actuation of the sliding sleeve 256 results in increased outward force upon the expandable sleeve 260, and subsequently, upon the cooling fins 264 resulting in more forceful contact and higher thermal conductivity between the cooling fins 264 and torque tube 250. Thus, additional control of cooling rates is facilitated by the magnitude of outward force applied to the expandable sleeve 260.

With the cooling fins 264 expanded into contact with the torque tube 250, a cooling fluid 570 (shown in FIG. 5), such as ambient air, is introduced into the cavity 258 to remove heat from the torque tube 250. Thermal contact between the cooling fins 264 and the torque tube 250 draws heat from the torque tube 250 to the cooling fins 264. Thus, the cooling fins 264 function as a heat sink to increase the surface area of material exposed to the cooling fluid 570, thereby increasing the cooing rate of the torque tube 250.

The cooling fins 264 are each formed from a composite material having a low thermal mass and a relatively high surface area. Utilization of a composite material provides a weight reduction compared to other materials, such as metals and metal alloys, and may also provide increased thermal conductivity compared to other materials. It is to be noted that more than eight cooling fins 264 may be utilized to sink additional heat from the torque tube 250; however, an excess number of cooling fins 264 may reduce flow of the cooling fluid 570 through the cavity 258. Additionally, it is contemplated that the size of the contact pads 264b may be increased as desired in order to increase surface area in contact between the contact pads 264b and the torque tube 250, facilitating increased heat transfer. However, it is contemplated that excessively enlarged contact pads 264b may provide marginal gains in increased heat transfer due to lateral heat transfer rates through the contact pads 264b to the shaft 264a. Moreover, the contact pressure between the contact pads 264b and the torque tube 250 may be adjusted to adjust the cooling rate of the torque tube. For example, increased contact pressure between the contact pads 264b and the torque tube may result in a reduction of cooling time for the torque tube 250.

Additionally, the sliding sleeve 256 and the expandable sleeve 260 may also be formed from a composite material. Examples of composite materials for forming the sliding sleeve 256, the expandable sleeve 260, and the cooling fins 264 include polyethylene fiber, epoxy graphite, and thermal pitch fiber. The sliding sleeve 256, the expandable sleeve 260, and the cooling fins 264 may be formed from the same or from different composite materials. In one aspect, the composite material may have a specific thermal conductivity ratio between about 5000 (W-lb)/(m-K-in$^3$) and about 9000 (W-lb)/(m-K-in$^3$), such as about 5000 (W-lb)/(m-K-in$^3$) to about 8000 (W-lb)/(m-K-in$^3$), for example, about 7000 (W-lb)/(m-K-in$^3$) to about 8000 (W-lb)/(m-K-in$^3$). Specific thermal conductivity ratio is defined as thermal conductivity (in Watts/meter-Kelvin) divided by density (pounds per cubic inch) of a selected material.

Composite materials within the disclosed ranges of specific thermal conductivity ratio generally have high thermal conductivities and low weights. In one example, the thermal pitch fiber may have a thermal conductivity of 640 of Watts/meter-Kelvin, and a density of 0.077 pounds per cubic inch, resulting in a specific thermal conductivity ratio of about 8300 (W-lb)/(m-Kelvin-in$^3$). In another example, a composite material may have a thermal conductivity within range of about 440 Watts/meter-Kelvin to about 700 Watts/meter-Kelvin, a tensile strength of about 280,000 pounds per square inch (280 ksi) to about 380 ksi, and modulus range of about 120,000,000 pounds per square inch (120 Msi). In yet another example, a composite material having a tensile modulus of about 9 Msi to about 10 Msi may be used to form sliding sleeve 256 and the expandable sleeve 260 in order to provide sufficient mechanical strength under exerted pressure. Additionally, composite materials which have a low electrical conductance may be selected in order to reduce the negative effect of electrical conduction when heating with an inductive heating element.

One example of a composite material for use in forming the sliding sleeve 256, the expandable sleeve 260, and the cooling fins 264 is Cytec Thornel® P-120 carbon fiber/epoxy system available from Cytec Industries Inc of Woodland Park, N.J. Cytec Thornel® P-120 has a density of 0.077 lb/in3, and tensile ultimate strength of 348 ksi, a modulus of elasticity of 120 Msi, an elongation at break of 0.5 percent, and a thermal conductivity of 640 W/m-Kelvin (30.2 btu/in-hr-F). In comparison, aluminum has a thermal conductivity of 10 btu/in-hr-F.

FIG. 4 is a graph 480 illustrating cooling rates for SMA actuators of the present disclosure versus conventional SMA actuators. The graph illustrates the temperature of a torque tube at the inlet side thereof, as indicated by line 482a, and at the outlet side thereof, as indicated by line 482b, for an SMA actuator of the present disclosure. In comparison, the temperature of a torque tube of a conventional SMA actuator is shown by lines 484a and 484b for the respective inlet and outlet of the conventional SMA actuator. It is to be noted that the inlet temperature is generally reduced more quickly than the outlet temperature due to the introduction of unheated cooling fluid at the inlet. Additionally, inner surfaces of the torque tube are cooled more quickly than outer surfaces due to the close proximity of the cooling fluid to the inner surfaces of the torque tube as the cooling fluid flows axially therethrough. Using ambient air at an inlet temperature of 70 degrees Fahrenheit and a flow rate of 200 pounds mass per hour as the cooling fluid, a conventional SMA actuator torque tube can be cooled from 360 degrees Fahrenheit to 120 degrees Fahrenheit or less in about 576 seconds. In contrast, the SMA actuator of the present disclosure, which utilizes an expandable sleeve having cooling fins coupled thereto, can cool an SMA actuator torque tube from 360 degrees Fahrenheit to 120 degrees Fahrenheit or less in about 360 seconds. Thus, SMA actuators of the present disclosure provide a 38 percent improvement in cooling over conventional SMA actuators.

Figure 5:
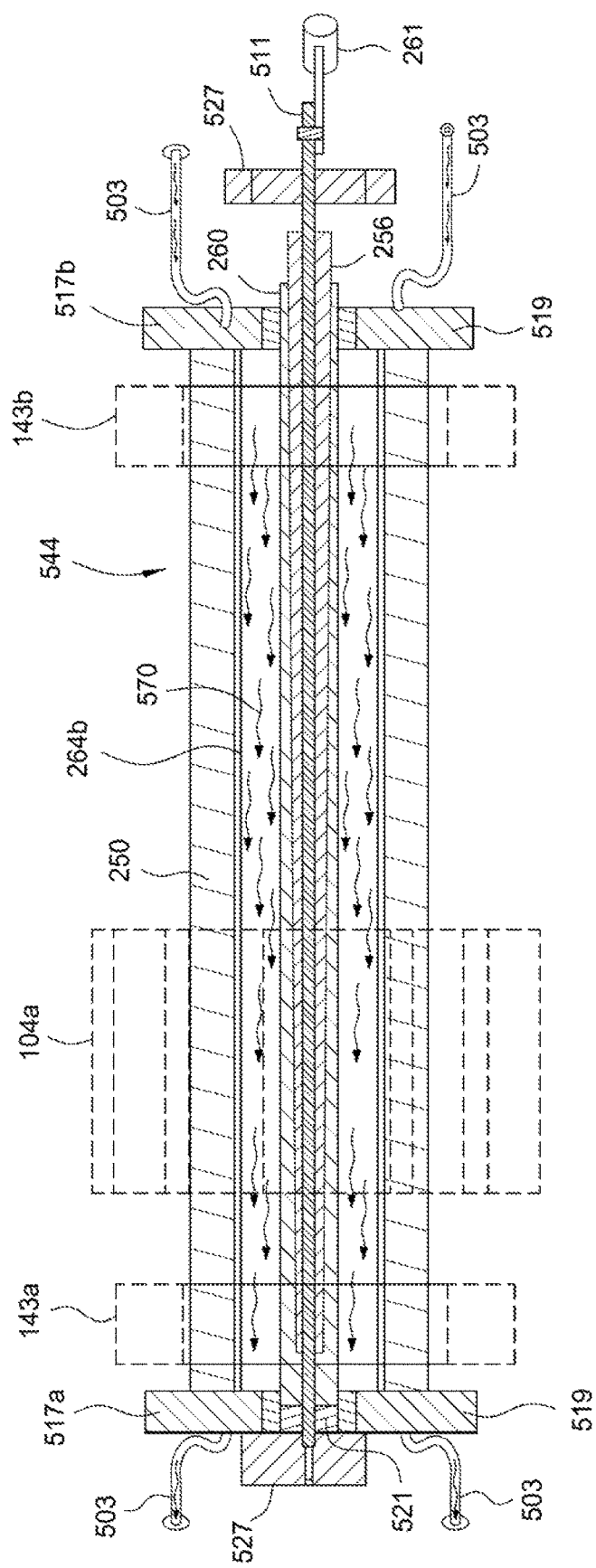
FIG. 5 illustrates a schematic partial view of an SMA actuator, according to another aspect of the disclosure.

FIG. 5 illustrates a schematic partial view of an SMA actuator 544, according to another aspect. The SMA actuator 544 is similar to SMA actuator 144 and is interchangeable therewith, but the SMA actuator 544 includes additional supporting components. The SMA actuator 544 includes sleeve supports 517a, 517b disposed at the laterally-outward ends of the SMA actuator 544 and adapted to support the expandable sleeve 260 as the sliding sleeve 256 moves relative thereto. The sleeve supports 517a, 517b include openings centrally formed therein for accommodating the sliding sleeve 256 and the expandable sleeve 260. Sealing rings 519 are disposed in the openings of the sleeve supports 517a, 517b around the sliding sleeve 256 and the expandable sleeve 260 to facilitate supporting and sealing of the sliding sleeve 256 and the expandable sleeve 260. The sealing rings 519 may be polymeric or elastomeric, and may include rubber, silicone, and the like.

A support rod 511 is disposed concentrically through the sliding sleeve 256 and the expandable sleeve 260. The support rod 511 may be supported at opposite ends thereof by rod supports 527. The rod supports 527 may include metal brackets having openings formed therein for accommodating the support rod 511. The support rod 511 is fixedly coupled to the sliding sleeve 256 such that when the sliding sleeve 256 is actuated by the actuator 261, the sliding sleeve 256 is moved relative to the expandable sleeve 260 to facilitate expansion of the expandable sleeve 260, as described above. A stopper 521 may be positioned within an opening of the sleeve support 517a adjacent a lateral end of the expandable sleeve 260 to prevent movement of the expandable sleeve as the sliding sleeve 256 is actuated. The SMA actuator 544 may also include one or more cooling fluid connections 503 (four are shown), such as hoses, to facilitate cooling of the torque tube 250 by providing or removing a cooling fluid through the cooling fluid connections 503.

Benefits of the present disclosure include increased cooling rates of SMA actuator torque tubes while still allowing rapid heating rates. The increased cooling rates improve SMA actuator cycle and response time. In addition, it is contemplated that the cooling devices disclosed herein, such as the cooling device 251, may be retrofitted to existing SMA actuators which lack a cooling device or contain a different cooling device. Moreover, the SMA actuators and cooling devices described herein have industrial applicability outside of the aircraft industry, and should not be construed as limited to aircraft.

While the foregoing is directed to aspects of the present disclosure, other and further aspects of the disclosure may be devised without departing from the basic scope thereof, and the scope thereof is determined by the claims that follow.

What is claimed is:

1. An actuator, comprising:
  a torque tube; and
  a cooling device disposed within the torque tube, the cooling device comprising:
    a radially expandable sleeve;
    a sliding sleeve disposed within the radially expandable sleeve and axially movable relative to the radially expandable sleeve; and
    one or more cooling fins coupled to an outer surface of the radially expandable sleeve, wherein axial movement of the sliding sleeve relative to the radially expandable sleeve causes the radially expandable sleeve and the one or more cooling fins coupled thereto to expand radially outward from a first position to a second position.

2. The actuator of claim 1, wherein the torque tube comprises a shape memory alloy.

3. The actuator of claim 2, wherein the shape memory alloy comprises nickel-titanium alloy, copper-aluminum-nickel alloy, copper-zinc-aluminum alloy, or iron-manganese-silicon alloy.

4. The actuator of claim 1, wherein the radially expandable sleeve, the sliding sleeve, and the one or more cooling fins comprise a composite material.

5. The actuator of claim 4, wherein the composite material comprises polyethylene fiber, epoxy graphite, or thermal pitch fiber.

6. The actuator of claim 4, wherein the composite material has a specific thermal conductivity ratio between about 5000 (W-lb)/(m-Kelvin-in$^3$) and about 9000 (W-lb)/(m-K-in$^3$).

7. The actuator of claim 4, wherein the composite material has a thermal conductivity within range of about 440 Watts/meter-Kelvin to about 700 Watts/meter-Kelvin.

8. The actuator of claim 4, wherein the composite material has a tensile strength of about 280 ksi to about 380 ksi.

9. The actuator of claim 1, further comprising a heating coil disposed around and in contact with the torque tube.

10. The actuator of claim 1, wherein each of the cooling fins comprising a shaft having a contact pad at a radially outward end thereof.

11. The actuator of claim 10, wherein each contact pad has an arcuate shape.

12. The actuator of claim 1, wherein the sliding sleeve and the radially expandable sleeve have complementing tapered surfaces.

13. The actuator of claim 1, wherein the sliding sleeve is a polygonal cone or truncated polygonal cone.

14. The actuator of claim 1, wherein the actuator is coupled to a control surface of an aircraft to actuate the control surface.

15. A method of operating an actuator, the actuator having a torque tube including a shape memory alloy and a cooling device disposed within the torque tube, the method comprising:
  moving the actuator in a first direction by applying heat to the torque tube, wherein one or more cooling fins of the cooling device are spaced from the torque tube while applying heat;
  axially actuating a sliding sleeve of the cooling device relative to an expandable sleeve of the cooling device to expand the expandable sleeve and to urge the one or more cooling fins into contact with the torque tube; and
  moving the actuator in a second direction opposite the first direction by cooling the torque tube, wherein the cooling the torque tube comprises flowing a cooling fluid adjacent the cooling fins.

16. The method of claim 15, wherein the cooling fluid flows axially through the torque tube.

17. The method of claim 15, further comprising adjusting a cooling rate of the torque tube by adjusting a contact pressure between the torque tube and the one or more cooling fins.

18. The method of claim 15, further comprising axially actuating the sliding sleeve in a direction to contract the expandable sleeve to space the one or more cooling fins from the torque tube.

19. A cooling device, comprising:
  a radially expandable sleeve;
  a sliding sleeve disposed within the radially expandable sleeve and axially movable relative to the radially expandable sleeve; and
  one or more cooling fins coupled to an outer surface of the radially expandable sleeve, wherein axial movement of the sliding sleeve relative to the radially expandable sleeve causes the radially expandable sleeve and the cooling fins coupled thereto to expand radially outward from a first position to a second position.

20. The cooling device of claim 19, wherein the radially expandable sleeve, the sliding sleeve, and the one or more cooling fins comprise a composite material.

21. The cooling device of claim 20, wherein the composite material comprises polyethylene fiber, epoxy graphite, or thermal pitch fiber.

22. The cooling device of claim 20, wherein the composite material has a specific thermal conductivity ratio between about 5000 (W-lb)/(m-Kelvin-in$^3$) and about 9000 (W-lb)/(m-K-in$^3$).

23. The cooling device of claim 20, wherein the composite material has a thermal conductivity within range of about 440 Watts/meter-Kelvin to about 700 Watts/meter-Kelvin.

24. The cooling device of claim 20, wherein the composite material has a tensile strength of about 280 ksi to about 380 ksi.

25. The cooling device of claim 19, wherein each of the cooling fins comprising a shaft having a contact pad at radially outward end thereof.

26. The cooling device of claim 25, wherein each contact pad has an arcuate shape.

27. The cooling device of claim 19, the sliding sleeve and the expandable sleeve have complementing tapered surfaces.

28. The cooling device of claim 19, wherein the sliding sleeve is a polygonal cone or truncated polygonal cone.

29. The cooling device of claim 19, wherein the cooling fins extend radially from the outward surface of the radially expandable sleeve.

* * * * *